United States Patent
Yamamoto et al.

(10) Patent No.: US 7,059,453 B2
(45) Date of Patent: Jun. 13, 2006

(54) ELECTROMAGNETIC BRAKE

(75) Inventors: Yoichiro Yamamoto, Wako (JP); Katsuhiro Kitamura, Wako (JP); Rikiya Kunii, Wako (JP); Keiichi Ooiso, Wako (JP); Kenji Honda, Wako (JP); Akihiro Iwazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/607,732

(22) Filed: Jun. 26, 2003

(65) Prior Publication Data
US 2004/0040801 A1 Mar. 4, 2004

(30) Foreign Application Priority Data
Aug. 30, 2002 (JP) .............................. 2002-253260

(51) Int. Cl.
*F16D 55/36* (2006.01)
*B60L 7/00* (2006.01)
*H01F 7/08* (2006.01)

(52) U.S. Cl. ...................... 188/71.5; 188/161; 188/164; 335/279; 335/281

(58) Field of Classification Search .............. 188/71.5, 188/158, 161, 164, 166, 171, 156, 163, 167, 188/157, 173; 192/84.1, 84.91, 84.92, 84.93, 192/84.9, 90; 310/93; 335/249, 250, 251, 335/255, 220, 261, 270, 271, 274, 279, 281
See application file for complete search history.

(56) References Cited
U.S. PATENT DOCUMENTS

| | | | | |
|---|---|---|---|---|
| 203,492 A | * | 5/1878 | Paine | 335/279 |
| 506,282 A | * | 10/1893 | Timmis | 335/261 |
| 750,132 A | * | 1/1904 | Timmis et al. | 335/261 |
| 1,661,623 A | * | 3/1928 | Pieper | 188/160 |
| 2,025,098 A | * | 12/1935 | Dudick | 188/171 |
| 2,672,965 A | * | 3/1954 | Miller | 192/84.9 |
| 2,936,053 A | * | 5/1960 | Reucker | 192/84.91 |
| 3,180,469 A | * | 4/1965 | Wiedmann et al. | 188/171 |
| 3,273,505 A | * | 9/1966 | Miles et al. | 417/413.1 |
| 3,404,762 A | * | 10/1968 | LeBlanc | 188/161 |
| 4,525,695 A | * | 6/1985 | Sheng et al. | 335/262 |
| 4,810,985 A | * | 3/1989 | Mesenich | 335/279 |
| 6,603,307 B1 | * | 8/2003 | Sekiya et al. | 188/161 |
| 6,668,996 B1 | * | 12/2003 | Nekado et al. | 192/84.91 |
| 6,811,001 B1 | * | 11/2004 | Hiyoshi et al. | 188/161 |
| 2003/0075395 A1 | * | 4/2003 | Iwazaki et al. | 188/161 |

* cited by examiner

*Primary Examiner*—Thomas Williams
(74) *Attorney, Agent, or Firm*—Lahive & Cockfield, LLP; Anthony A. Laurentano, Esq.

(57) ABSTRACT

An electromagnetic brake interposed between a fixed housing and a rotating member. The electromagnetic brake includes a multiplate brake mechanism, a ringlike core member fixed through an annular brake guide inside the fixed housing, an exciting coil accommodated in an annular groove formed on the core member, and a ringlike armature member arranged radially outside of the core member. Each of the core member and the armature member has a plurality of tapering surfaces. The tapering surfaces of the core member are respectively complementary in shape to the tapering surfaces of the armature member. The electromagnetic brake further includes a cylindrical pressure member movable in a direction of pressing the multiplate brake mechanism. The cylindrical pressure member has one end fixed to the armature member and another end engaged with the multiplate brake mechanism.

11 Claims, 11 Drawing Sheets

ELECTROMAGNETIC BRAKE

BACKGROUND OF THE INVENTION

1. Field of the Invention

The present invention relates to an electromagnetic brake and a drive force distributing device for a vehicle using the electromagnetic brake.

2. Description of the Related Art

A differential is located in a power train of a vehicle to maintain torque distribution between right and left wheels of the vehicle such that torque is equally divided between the right and left wheels and to rotate the outside wheel faster than the inside wheel in cornering, thereby reliably obtaining smooth cornering. While the primary role of the differential is to obtain smooth cornering as mentioned above, there is a case that one of the right and left wheels may be caught to slip in a muddy place during rough-road running. In this case, the resistance from the road to the wheel caught to slip in the muddy place is small, so that torque is almost transmitted to this slipping wheel and hardly transmitted to the other wheel. As a result, the drive force for driving the wheels becomes lacking to cause a problem that the slipping wheel cannot escape from the muddy place. This problem is a defect inherent to a general differential.

Known is a special type of differential having a differential motion limiting mechanism capable of compensating for the above inherent defect of a general differential. This type of differential is referred to as a limited slip differential (LSD). A planetary gear type differential is generally known in the art. For example, such a planetary gear type differential gear assembly having a limited slip differential mechanism composed of an electromagnetic clutch and a multiplate clutch is disclosed in Japanese Patent Laid-open No. Hei 6-33997.

In this differential gear assembly, an attraction force between a solenoid and an armature forming the electromagnetic clutch is applied to the multiplate clutch to press it and selectively control an engaging force generated in the multiplate clutch. A connecting member consisting of a plurality of bars is located between a pressure plate of the multiplate clutch and the armature. That is, one end of each bar of the connecting member is fixed to the pressure plate of the multiplate clutch, and the other end comes into abutment against an inner circumferential portion of the armature when the solenoid is operated.

In the conventional differential gear assembly mentioned above, the plural bars fixed to the pressure plate extend in a direction substantially perpendicular to the pressure plate. Accordingly, in the case that any of these bars are inclined to the pressure plate, there is a problem that a pressing force of the armature attracted by the solenoid to press the pressure plate of the multiplate clutch may not be uniformly transmitted to the pressure plate. Further, in the conventional differential gear assembly described in the above publication, the electromagnetic clutch controls the engaging force of the multiplate clutch, so that the plural bars as pressure members are located so as to correspond to the inner circumferential portion of the armature. However, in a multiplate brake structure having a plurality of brake plates and a plurality of brake discs, these brake plates and brake discs are generally located so as to correspond to an outer circumferential portion of the armature from the viewpoint of the structure. Accordingly, it is difficult that the conventional structure described in the above publication such that the multiplate clutch is operatively connected to the armature at its inner circumferential portion is applied to the multiplate brake structure without any changes.

The present applicant has already proposed an electromagnetic brake solving the above problem (Japanese Patent Application No. 2001-267785). This electromagnetic brake in the related art includes a multiplate brake mechanism, a ringlike core member having an annular exciting coil, and a ringlike armature member opposed to the annular exciting coil of the core member. The electromagnetic brake further includes a cylindrical pressure member provided so as to surround the outer circumferential surface of the core member and be movable in a direction of pressing the multiplate brake mechanism as being guided by the core member, the pressure member having one end fixed to an outer circumferential portion of the armature member and another end engaged with the multiplate brake mechanism.

In this electromagnetic brake, an air gap is defined between the armature member and the core member, and the armature member is attracted to the core member by passing a current through the exciting coil, thereby engaging the multiplate brake mechanism. The thrust by the exciting coil is largely influenced by the amount of the air gap. The cylindrical pressure member of this electromagnetic brake has a function of transmitting the thrust by the exciting coil to the multiplate brake mechanism and a function of radially positioning the armature member to allow circumferentially uniform displacement of the armature member.

In the conventional electromagnetic brake, priority is given to the accuracy of radial positioning of the armature member, so that the cylindrical pressure member and the core member must be formed of the same type of material in consideration of linear expansion due to a temperature change. Accordingly, the cylindrical pressure member is formed of stainless steel in the conventional electromagnetic brake. On the other hand, a housing for accommodating the electromagnetic brake is formed of aluminum alloy for the purpose of weight reduction, and the core member is fixed to the housing. As a result, the coefficient of linear expansion of the housing to which the core member is fixed does not match with that of the cylindrical pressure member interposed between the multiplate brake mechanism and the armature member. Accordingly, in the electromagnetic brake as a whole, the air gap between the armature member and the core member changes with a temperature change, causing variations in engaging force (braking force) of the multiplate brake mechanism.

Accordingly, in the case of applying this electromagnetic brake to a drive force distributing device for a vehicle, there arises a problem such that it is difficult to properly distribute a drive force in response to a temperature change. Further, in the conventional electromagnetic brake, the multiplate brake mechanism is arranged at a radially outer position, and the ringlike armature member is arranged at an axially outer position opposite to the multiplate brake mechanism with respect to the core member. This structure is intended mainly to make the armature member axially straight push the multiplate brake mechanism through the cylindrical pressure member, so that the ringlike core member and the ringlike armature member are large in outer diameter. Further, in order to suppress the effects of changes in the air gap between the core member and the armature member, inclination of the armature member, etc., machining accuracy is required, for example, radial positioning is required between the outer circumference of the core member and the inner circumference of the cylindrical pressure member.

SUMMARY OF THE INVENTION

It is therefore an object of the present invention to provide an electromagnetic brake which can suppress variations in the air gap between the core member and the armature member due to a temperature change.

It is another object of the present invention to provide an electromagnetic brake which can be reduced in size and weight by changing the arrangement of the ringlike armature member with respect to the ringlike core member.

In accordance with an aspect of the present invention, there is provided an electromagnetic brake interposed between a fixed housing and a rotating member at least partially accommodated in the fixed housing. The electromagnetic brake includes a multiplate brake mechanism having a plurality of brake plates mounted on the fixed housing and a plurality of brake discs mounted on the rotating member so as to be arranged in alternate relationship with the brake plates; a ringlike core member fixed in the fixed housing, the ringlike core member having an annular groove and a first tapering surface inclined a first angle with respect to the axis of the ringlike core member; and an annular exciting coil accommodated in the annular groove of the ringlike core member. The electromagnetic brake further includes a ringlike armature member arranged radially outside of the ringlike core member, the ringlike armature member having a second tapering surface complementary in shape to the first tapering surface, the second tapering surface being opposed to the first tapering surface. A first annular restriction member is provided between the outer circumferential surface of the ringlike core member and the inner circumferential surface of the ringlike armature member at a position adjacent to the first and second tapering surfaces. The electromagnetic brake further includes a cylindrical pressure member movable in a direction of pressing the multiplate brake mechanism, the cylindrical pressure member having a first end fixed to an outer circumferential portion of the ringlike armature member and a second end engaged with the multiplate brake mechanism.

With this configuration, the ringlike armature member is arranged radially outside of the ringlike core member, so that the size of the cylindrical pressure member can be greatly reduced. As a result, the electromagnetic brake can be reduced in size and weight.

Preferably, the ringlike core member further has a third tapering surface inclined a second angle with respect to the axis of the ringlike core member; and the ringlike armature member further has a fourth tapering surface complementary in shape to the third tapering surface. A second annular restriction member is provided between the outer circumferential surface of the ringlike core member and the inner circumferential surface of the ringlike armature member at a position adjacent to the third and fourth tapering surfaces.

Preferably, the electromagnetic brake further includes elastic means provided between the ringlike core member and the ringlike armature member for axially exerting an elastic force. With this arrangement, the contact between the armature member and the core member can be prevented by the elastic means. Further, the elastic force of the elastic means is exerted in a direction of separating the brake discs and the brake plates of the multiplate brake mechanism. Accordingly, dragging in the multiplate brake mechanism in the off state of the electromagnetic brake can be reduced.

Preferably, the ringlike core member is mounted through an annular brake guide to the fixed housing, and the annular brake guide is formed of the same type of material as those of the core member and the armature member. Thus, the ringlike core member is fixed not directly to the fixed housing, but through the annular brake guide formed of the same type of material as those of the core member and the armature member to the fixed housing. Accordingly, it is possible to suppress a change in air gap between the armature member and the core member due to a temperature change.

In accordance with another aspect of the present invention, there is provided an electromagnetic brake interposed between a fixed housing and a rotating member at least partially accommodated in the fixed housing, including a multiplate brake mechanism having a plurality of brake plates mounted on the fixed housing and a plurality of brake discs mounted on the rotating member so as to be arranged in alternate relationship with the brake plates; a ringlike core member having an annular groove and a first tapering surface inclined a first angle with respect to the axis of the ringlike core member; an annular exciting coil accommodated in the annular groove of the ringlike core member; a ringlike armature member arranged radially inside of the ringlike core member, the ringlike armature member having a second tapering surface complementary in shape to the first tapering surface, the second tapering surface being opposed to the first tapering surface; a first annular restriction member provided between the inner circumferential surface of the ringlike core member and the outer circumferential surface of the ringlike armature member at a position adjacent to the first and second tapering surfaces; and a pressure member movable in a direction of pressing the multiplate brake mechanism, the pressure member having a first end fixed to the ringlike armature member and a second end engaged with the multiplate brake mechanism.

With this configuration, the size of the ringlike armature member can be reduced to thereby attain a reduction in size and weight of the electromagnetic brake.

In accordance with a further aspect of the present invention, there is provided an electromagnetic actuator including a ringlike core member having an annular groove and a first tapering surface inclined a first angle with respect to the axis of the ringlike core member; an annular exciting coil accommodated in the annular groove of the ringlike core member; a ringlike armature member arranged radially outside of the ringlike core member, the ringlike armature member having a second tapering surface complementary in shape to the first tapering surface, the second tapering surface being opposed to the first tapering surface; and restricting means for restricting radial movement of ringlike armature member.

Preferably, the ringlike core member further has a third tapering surface inclined a second angle with respect to the axis of the ringlike core member; and the ringlike armature member further has a fourth tapering surface complementary in shape to the third tapering surface.

In accordance with a still further aspect of the present invention, there is provided an electromagnetic actuator including a ringlike core member having an annular groove and a first tapering surface inclined a first angle with respect to the axis of the ringlike core member; an annular exciting coil accommodated in the annular groove of the ringlike core member; a ringlike armature member arranged radially inside of the ringlike core member, the ringlike armature member having a second tapering surface complementary in shape to the first tapering surface, the second tapering surface being opposed to the first tapering surface; and restricting means for restricting radial movement of the ringlike armature member.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
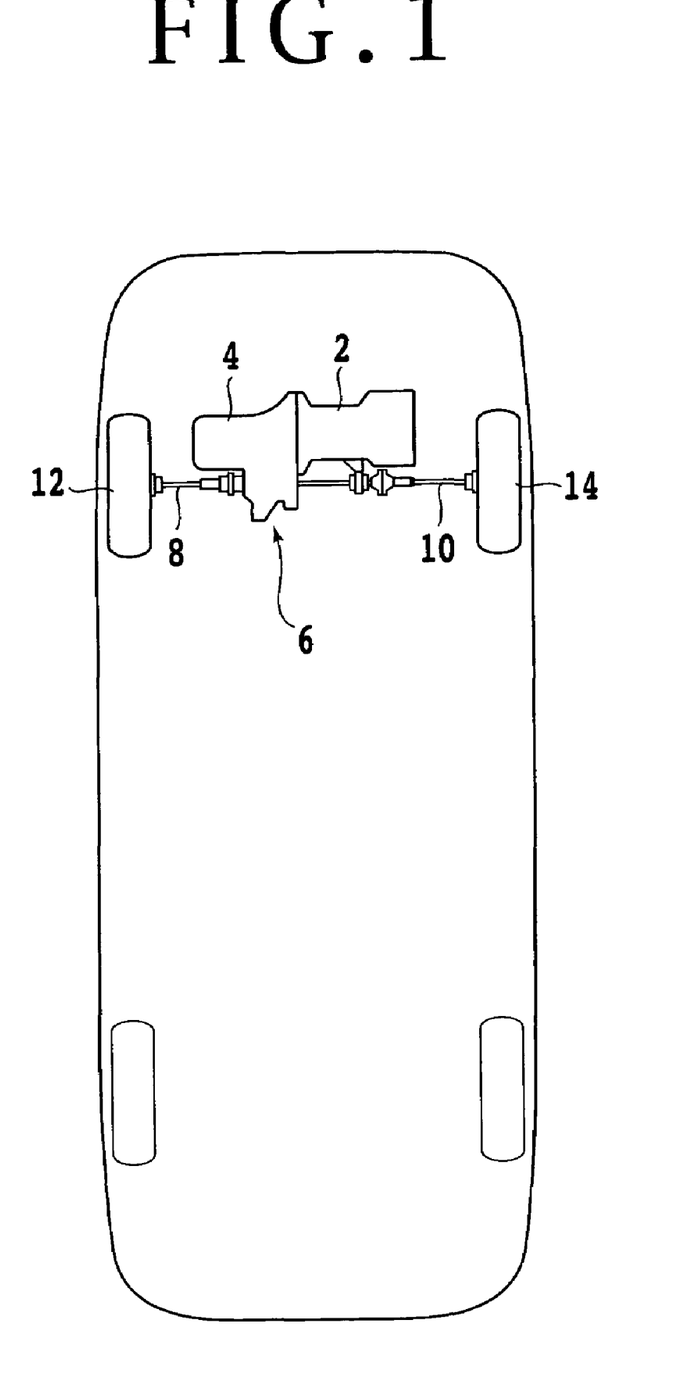
FIG. 1 is a schematic plan view showing the configuration of a front-engine front-drive vehicle on which the drive force distributing device according to the present invention is mounted.

A preferred embodiment of the present invention will now be described in detail with reference to the drawings. FIG. 1 is a schematic plan view showing the configuration of a front-engine front-drive (FF) vehicle to which a drive force distributing device 6 having the electromagnetic brake of the present invention is applied. A drive force from an engine 2 is transmitted through a transmission 4 to the drive force distributing device 6. The drive force transmitted is distributed between a left front axle 8 and a right front axle 10 by the drive force distributing device 6. The drive force thus distributed drives a left front wheel 12 mounted on the left front axle 8 and a right front wheel 14 mounted on the right front axle 10.

Figure 2:
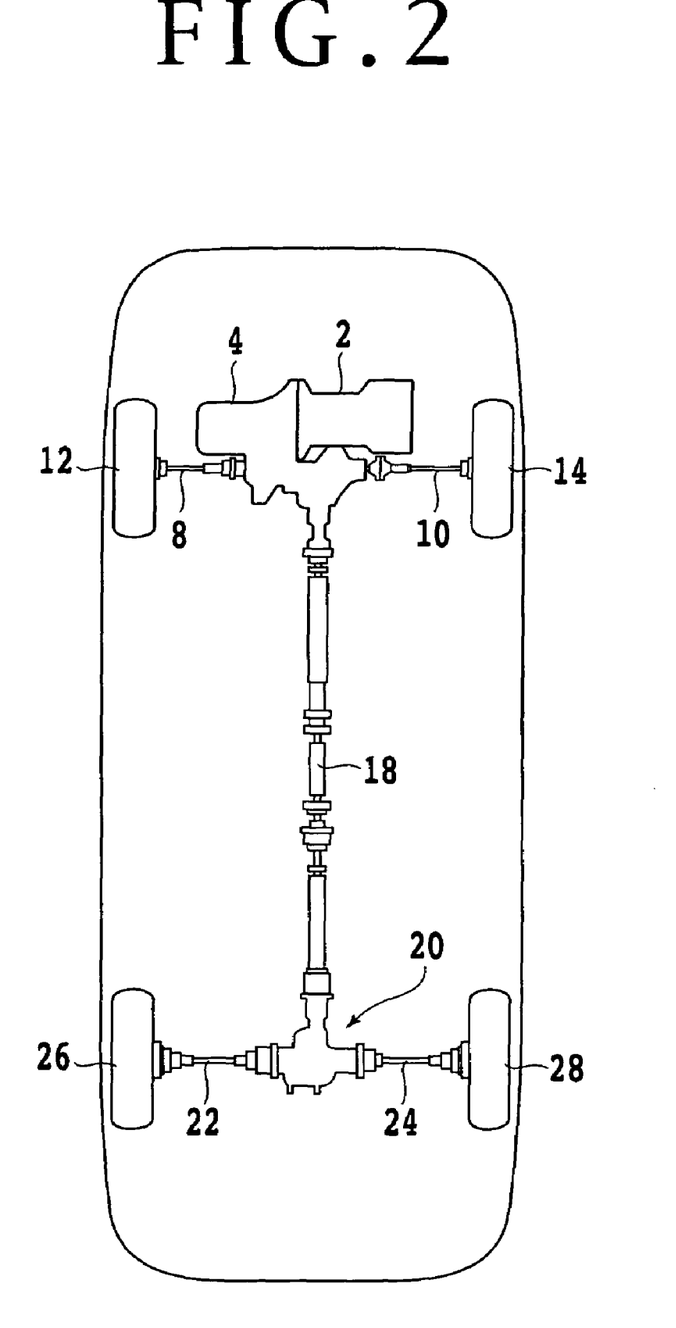
FIG. 2 is a schematic plan view showing the configuration of a four-wheel drive vehicle on which the drive force distributing device according to the present invention is mounted.

FIG. 2 is a schematic plan view showing the configuration of a four-wheel drive vehicle to which a drive force distributing device 20 having the electromagnetic brake of the present invention is applied. A drive force from an engine 2 drives left and right front wheels 12 and 14 through a transmission 4 and left and right front axles 8 and 10. The drive force is also transmitted through a propeller shaft 18 to the drive force distributing device 20 having substantially the same configuration as that of the drive force distributing device 6 shown in FIG. 1.

The drive force transmitted to the drive force distributing device 20 is distributed between a left rear axle 22 and a right rear axle 24 at a given ratio. The drive force thus distributed drives a left rear wheel 26 mounted on the left rear axle 22 and a right rear wheel 28 mounted on the right rear axle 24. As will be hereinafter described in detail, the drive force distributing device 20 incorporates a pair of electromagnetic brakes. By controlling braking forces of the electromagnetic brakes, the drive force from the propeller shaft 18 can be arbitrarily distributed between the rear wheels 26 and 28. Further, in the case of idling the rear wheels 26 and 28, the drive force from the engine 2 can be entirely supplied to the front wheels 12 and 14. In this case, this four-wheel drive vehicle operates as an FF vehicle.

Figure 3:
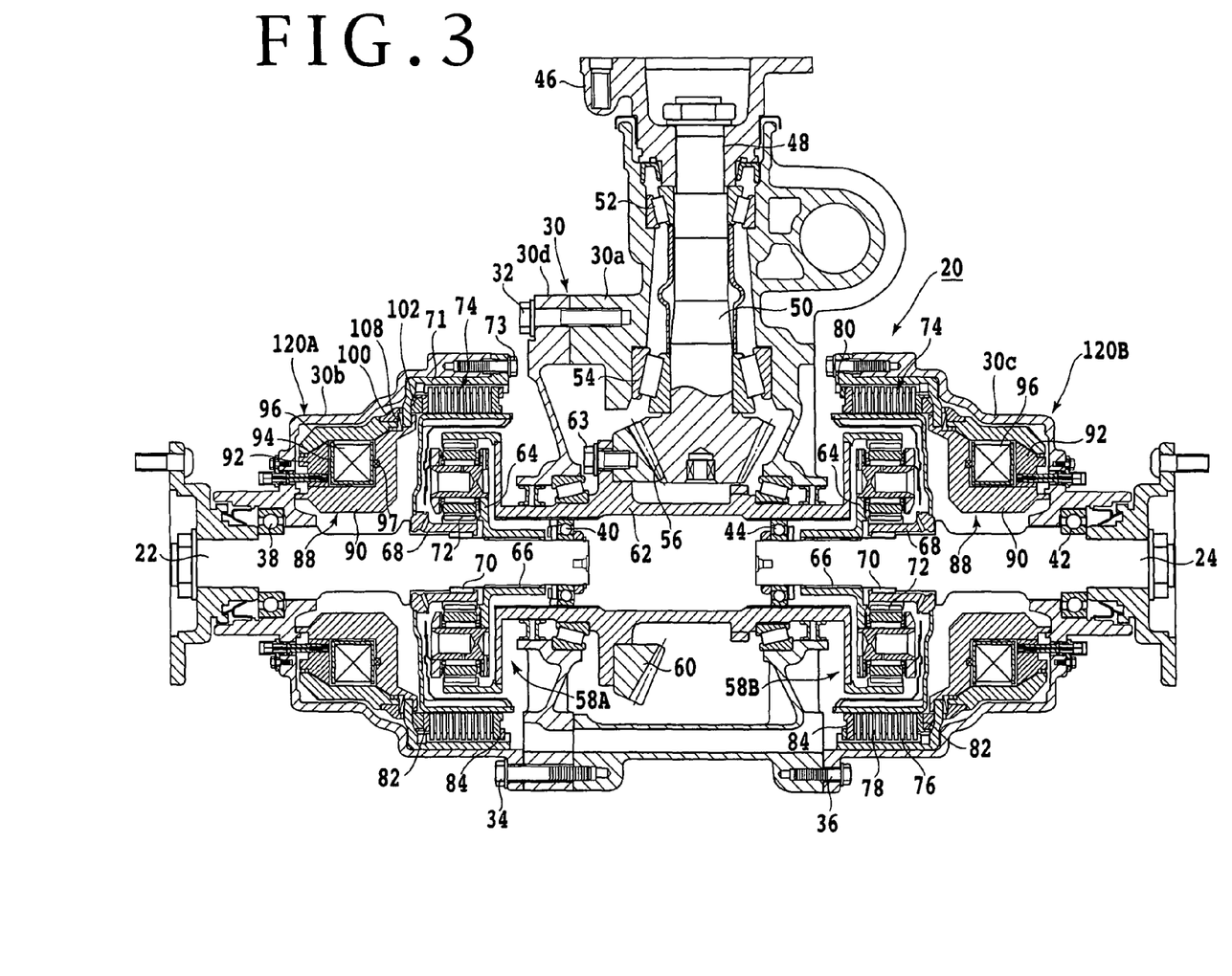
FIG. 3 is a sectional view of the drive force distributing device shown in FIG. 2.

Referring to FIG. 3, there is shown a sectional view of the drive force distributing device 20 of the present invention. Reference numeral 30 denotes a fixed housing. The fixed housing 30 is composed of a central housing 30a, a left side housing 30b, a right side housing 30c, and an intermediate housing 30d. The housing 30 is formed of aluminum alloy. The left side housing 30b and the intermediate housing 30d are fastened to the central housing 30a by screws 32 and 34. The right side housing 30c is fastened to the central housing 30a by screws 36.

The left rear axle 22 is rotatably supported in the housing 30 by a pair of bearings 38 and 40. Similarly, the right rear axle 24 is rotatably supported in the housing 30 by a pair of bearings 42 and 44. The left rear axle 22 is connected to the left rear wheel 26, and the right rear axle 24 is connected to the right rear wheel 28. Reference numeral 46 denotes a companion flange, which is fastened to the propeller shaft 18 shown in FIG. 2 by screws (not shown). An input shaft 50 is rotatably supported in the housing 30 by a pair of needle bearings 52 and 54. The input shaft 50 is connected at its front end to the companion flange 46 by splines 48. The input shaft 50 is formed at its rear end with a bevel gear 56.

A planetary gear assembly 58A is interposed between the input shaft 50 and the left rear axle 22, and a planetary gear assembly 58B is interposed between the input shaft 50 and the right rear axle 24. The planetary gear assembly 58A has substantially same structure as that of the planetary gear assembly 58B, so like parts are denoted by the same reference numerals and only the planetary gear assembly 58A will now be primarily described.

A bevel gear 60 meshes with the bevel gear 56 of the input shaft 50, and a ring gear 62 is fastened to the bevel gear 60 by screws 63. The ring gear 62 is a ring gear common to the planetary gear assemblies 58A and 58B. The planetary gear assembly 58A further includes a planetary carrier 64, a sun gear 68, and a plurality of planet gears 72 (one of which being shown). The planetary carrier 64 is fixed to the left rear axle 22 by splines 66. The sun gear 68 is rotatably mounted on the left rear axle 22 by a needle bearing 70. Each planet gear 72 is carried by the planetary carrier 64 and meshes with both the sun gear 68 and the ring gear 62.

Figure 4:
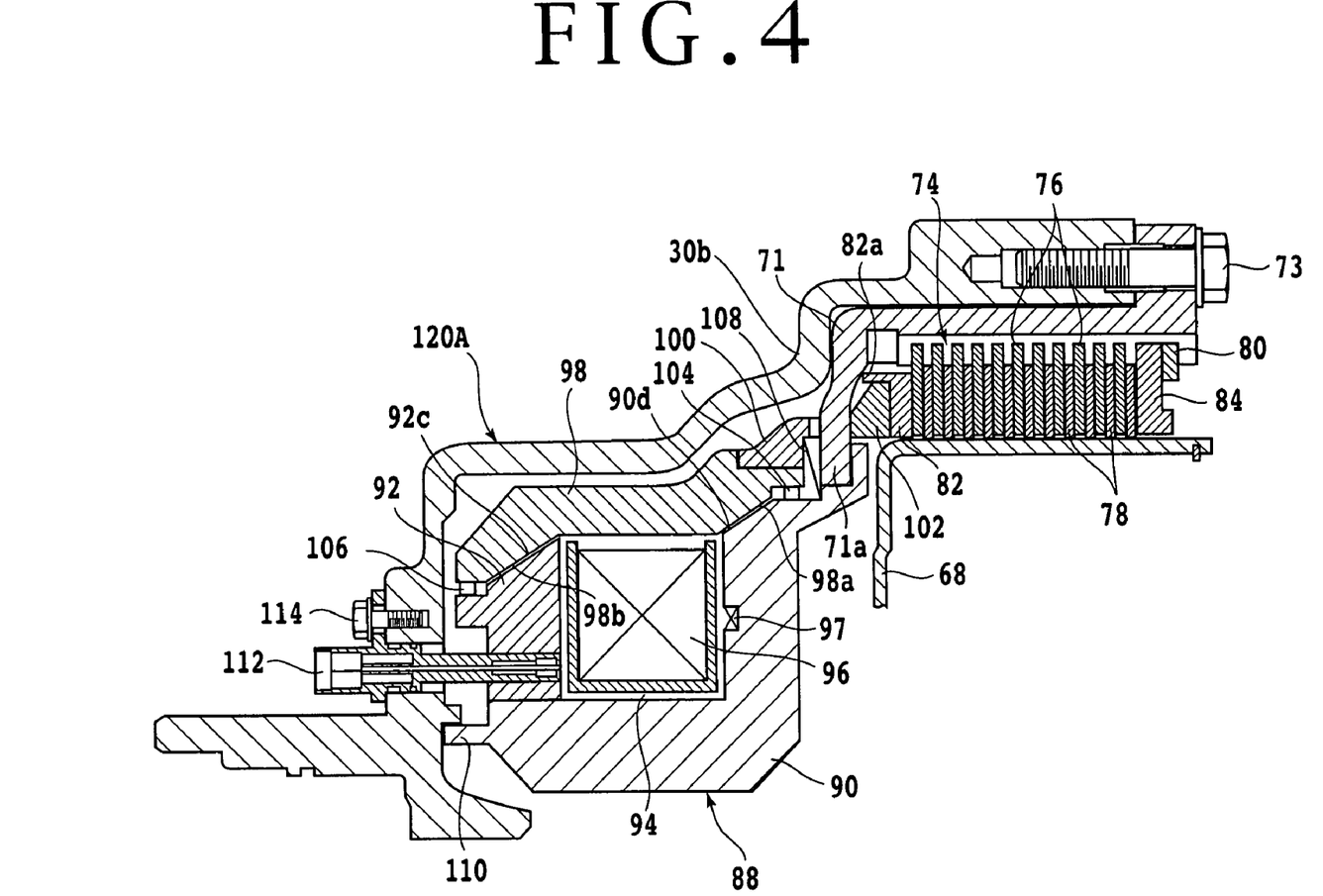
FIG. 4 is a partially cutaway, sectional view of an electromagnetic brake according to a first preferred embodiment of the present invention.

An annular brake guide 71 is fixed to the left side housing 30b by screws 73. The housing 30 is formed of aluminum alloy, and the annular brake guide 71 is formed of stainless steel. As best shown in FIG. 4 which is an enlarged view of an essential part in FIG. 3, reference numeral 74 denotes a wet type multiplate brake mechanism. The wet type multiplate brake mechanism 74 includes a plurality of brake plates 76 mounted on the annular brake guide 71 and a plurality of brake discs 78 mounted on the sun gear 68. The brake plates 76 and the brake discs 78 are alternately arranged.

Each brake plate 76 is mounted on the annular brake guide 71 so as to be axially movable and unrotatable, and each brake disc 78 is mounted on the sun gear 68 so as to be axially movable and unrotatable. A snap ring 80 is mounted on the annular brake guide 71 to axially position one end (the right end) of the multiplate brake mechanism 74. Fine adjustment of this positioning is made by controlling the thicknesses of end plates 82 and 84.

Figure 5:
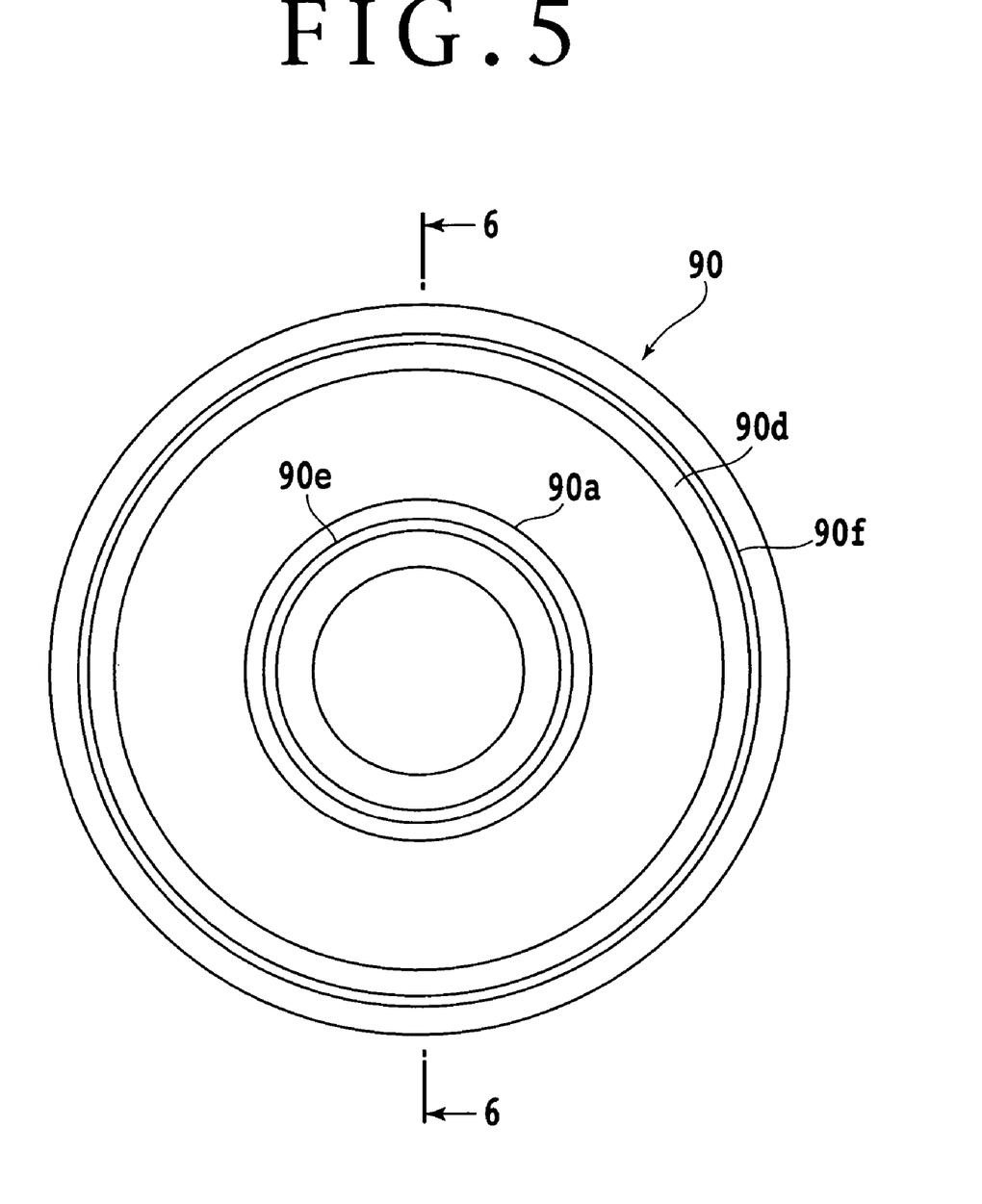
FIG. 5 is an elevational view of a first ringlike core.
Figure 6:
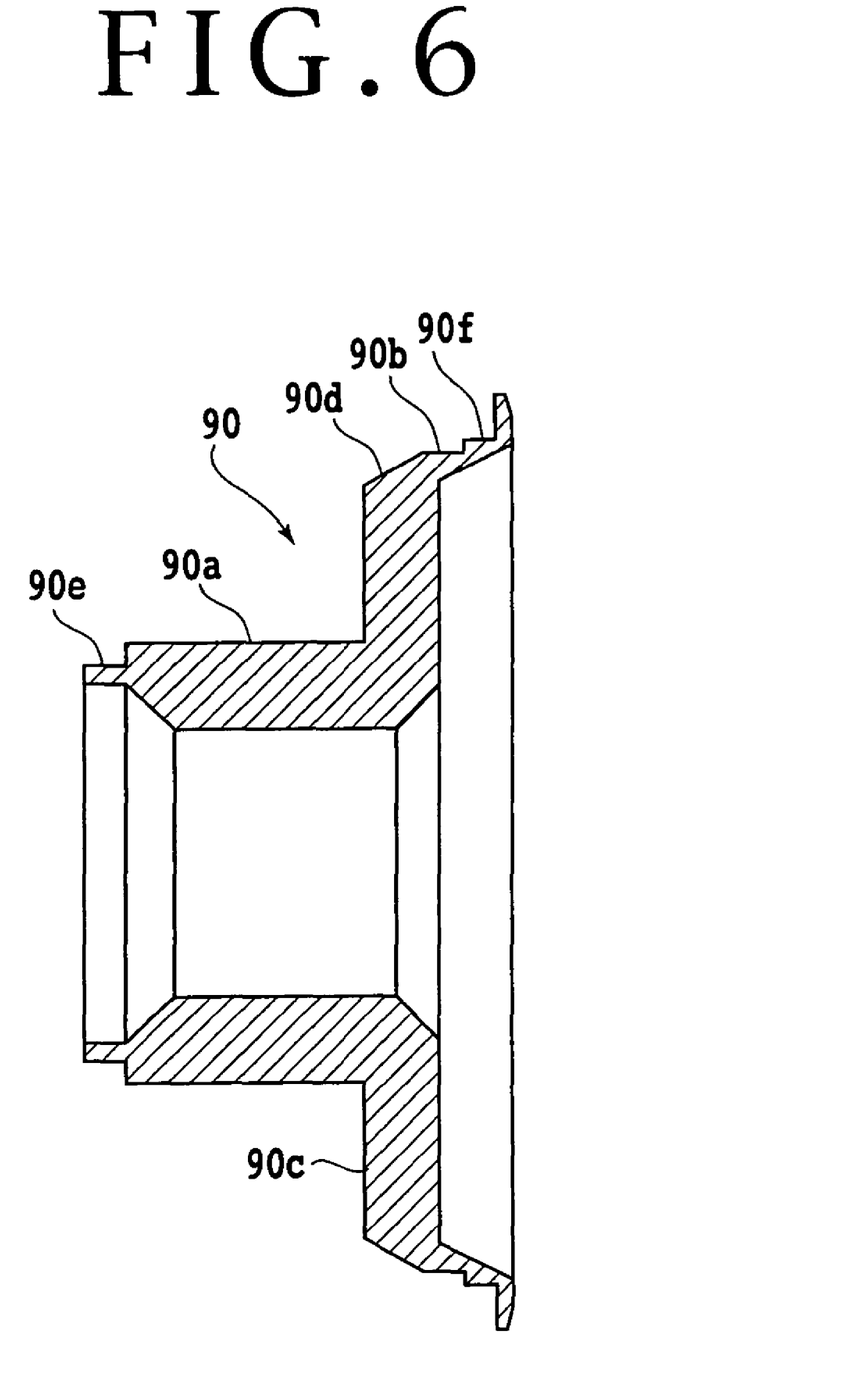
FIG. 6 is a cross section taken along the line 6—6 in FIG. 5.

Reference numeral 88 denotes a ringlike core member formed of a magnetic material. The ringlike core member 88 includes a first ringlike core 90 and a second ringlike core 92. As shown in FIGS. 5 and 6 which are an elevational view of the first ringlike core 90 and a cross section taken along the line 6—6 in FIG. 5, respectively, the first ringlike core 90 has a small-diameter portion 90a, a large-diameter portion 90b larger in diameter than the small-diameter portion 90a, and a shoulder portion 90c formed between the small-diameter portion 90a and the large-diameter portion 90b. The first ringlike core 90 further has a first tapering surface 90d inclined a first angle with respect to the axis of the core 90 between the shoulder portion 90c and the large-diameter portion 90b. An engaging portion 90e smaller in diameter than the small-diameter portion 90a is formed at one end of the first ringlike core 90, and another engaging portion 90f larger in diameter than the large-diameter portion 90b is formed near the other end of the first ringlike core 90.

Figure 7:
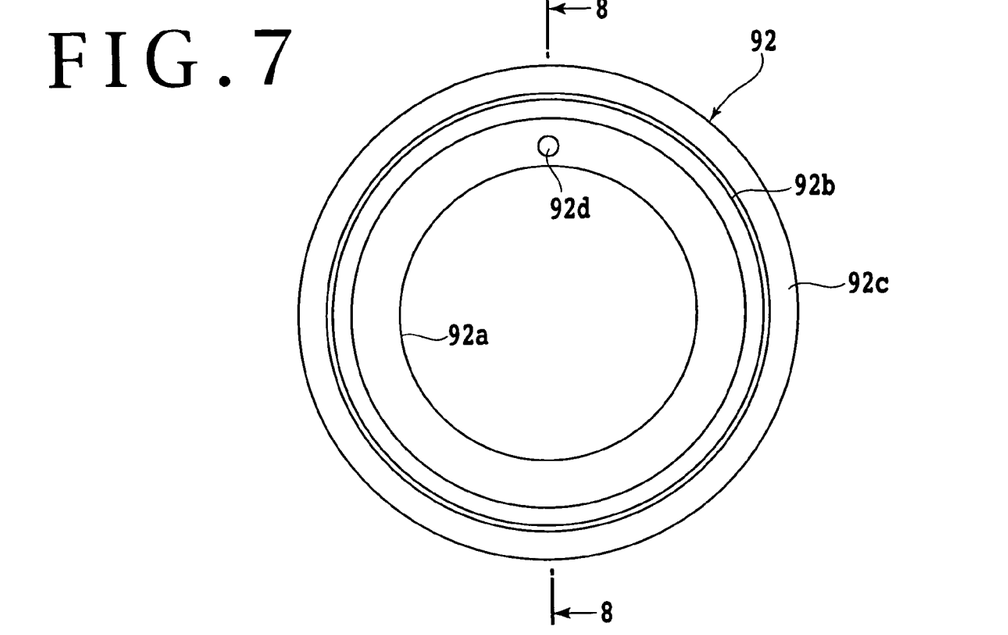
FIG. 7 is an elevational view of a second ringlike core.
Figure 8:
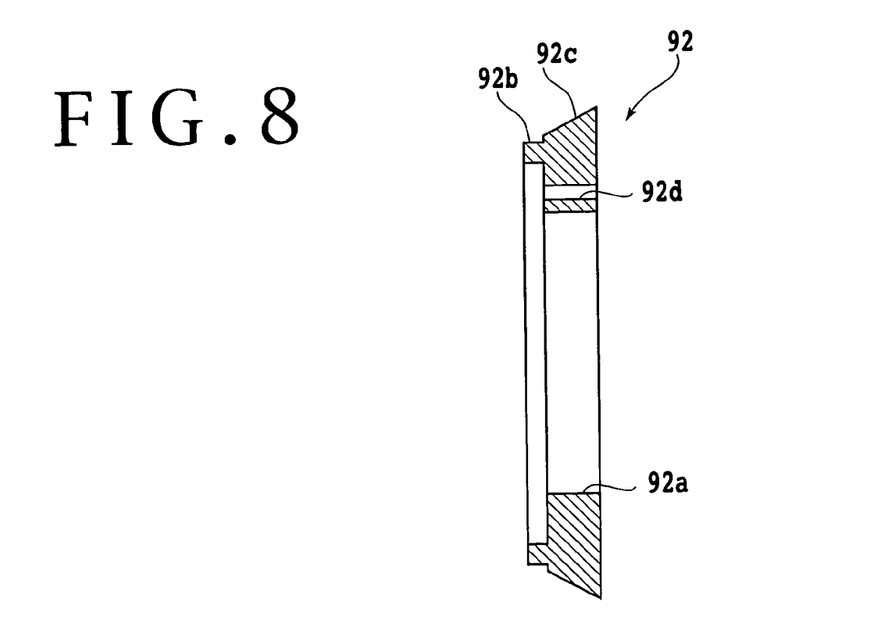
FIG. 8 is a cross section taken along the line 8—8 in FIG. 7.

FIG. 7 is an elevational view of the second ringlike core 92, and FIG. 8 is a cross section taken along the line 8—8 in FIG. 7. The second ringlike core 92 has a central hole 92a engaging with the small-diameter portion 90a of the first ringlike core 90, a mounting portion 92b for an annular restriction member to be hereinafter described, and a second tapering surface 92c inclined a second angle with respect to the axis of the core 92. Preferably, the first tapering surface 90d and the second tapering surface 92c have the same tapering angle, that is, the first angle and the second angle are equal to each other. The second ringlike core 92 further has a hole 92d in which a terminal 112 of an exciting coil 96 is inserted.

Referring again to FIG. 4, an annular groove 94 is defined by the first ringlike core 90 and the second ringlike core 92, and the exciting coil 96 having an annular shape is accommodated in the annular groove 94. A search coil 97 is provided adjacent to the exciting coil 96. The search coil 97 is provided to detect the intensity of magnetic flux in passing a current through the exciting coil 96 and to feedback control the current supplied to the exciting coil 96 according to the detected intensity of magnetic flux.

The engaging portion 90e of the first ringlike core 90 is engaged with an engaging portion 110 of the left side housing 30b, and the engaging portion 90f of the first ringlike core 90 is engaged with a front end portion 71a of the annular brake guide 71, thereby fixing the ringlike core member 88 in the housing 30. The terminal 112 of the exciting coil 96 is inserted in the hole 92d of the second ringlike core 92, and is fixed to the left side housing 30b by a screw 114.

A ringlike armature member 98 formed of a magnetic material is located radially outside of the ringlike core member 88. The ringlike armature member 98 has a third tapering surface 98a complementary in shape to the first tapering surface 90d of the ringlike core member 88 and a fourth tapering surface 98b complementary in shape to the second tapering surface 92c of the ringlike core member 88. The ringlike armature member 98 is engaged radially outside of the ringlike core member 88 so that the third tapering surface 98a is opposed to the first tapering surface 90d and that the fourth tapering surface 98b is opposed to the second tapering surface 92c.

A first air gap is formed between the first tapering surface 90d and the third tapering surface 98a, and a second air gap is formed between the second tapering surface 92c and the fourth tapering surface 98b. Preferably, the first air gap is substantially equal to the second air gap. An annular extension 100 is press-fitted with the ringlike armature member 98, and an annular piston 102 is interposed between the annular extension 100 and the end plate 82 of the multiplate brake mechanism 74. The annular extension 100 and the annular piston 102 are formed of stainless steel. In this specification, the combination of the annular extension 100 and the annular piston 102 is referred to also as a cylindrical pressure member.

Figure 9:
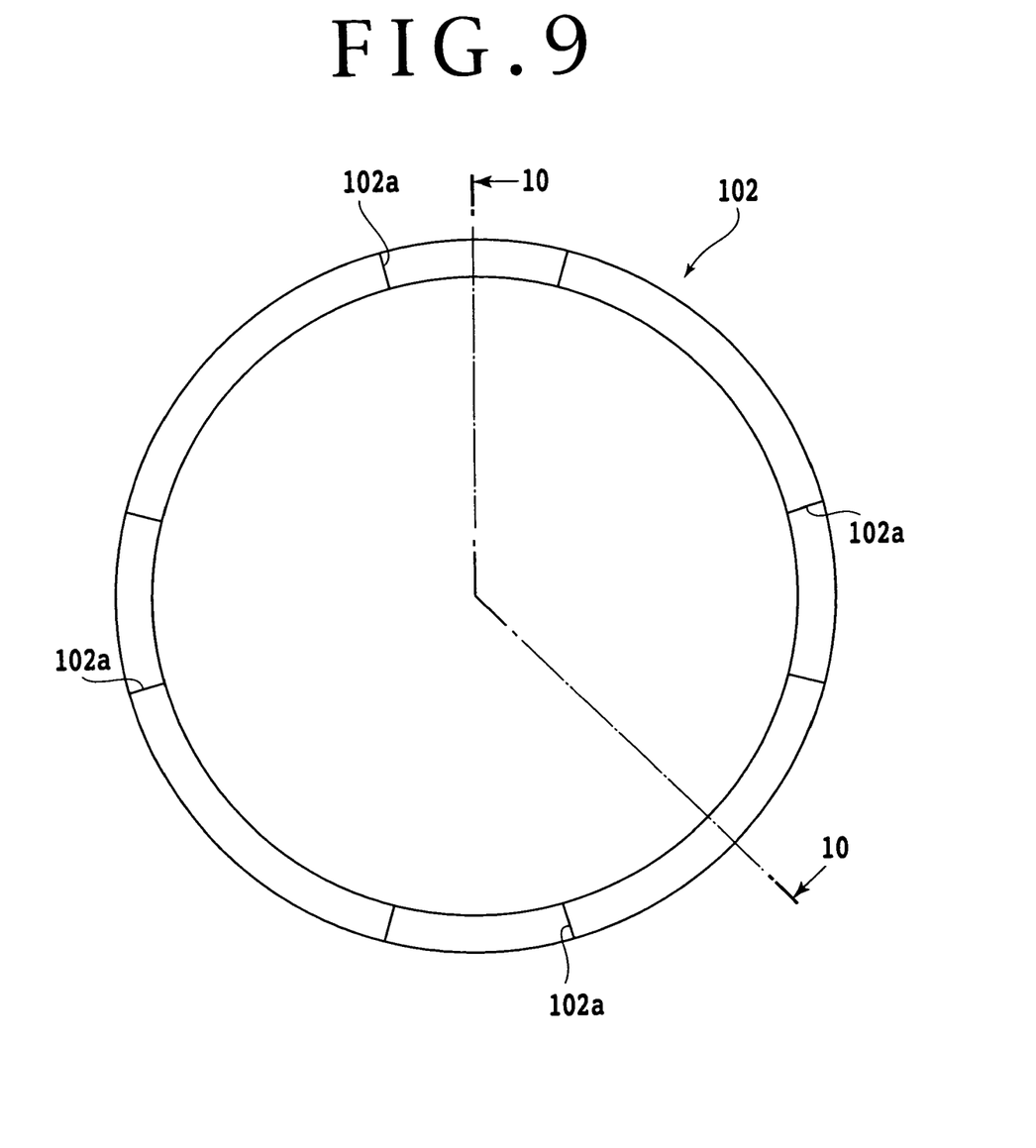
FIG. 9 is an elevational view of an annular piston.
Figure 10:
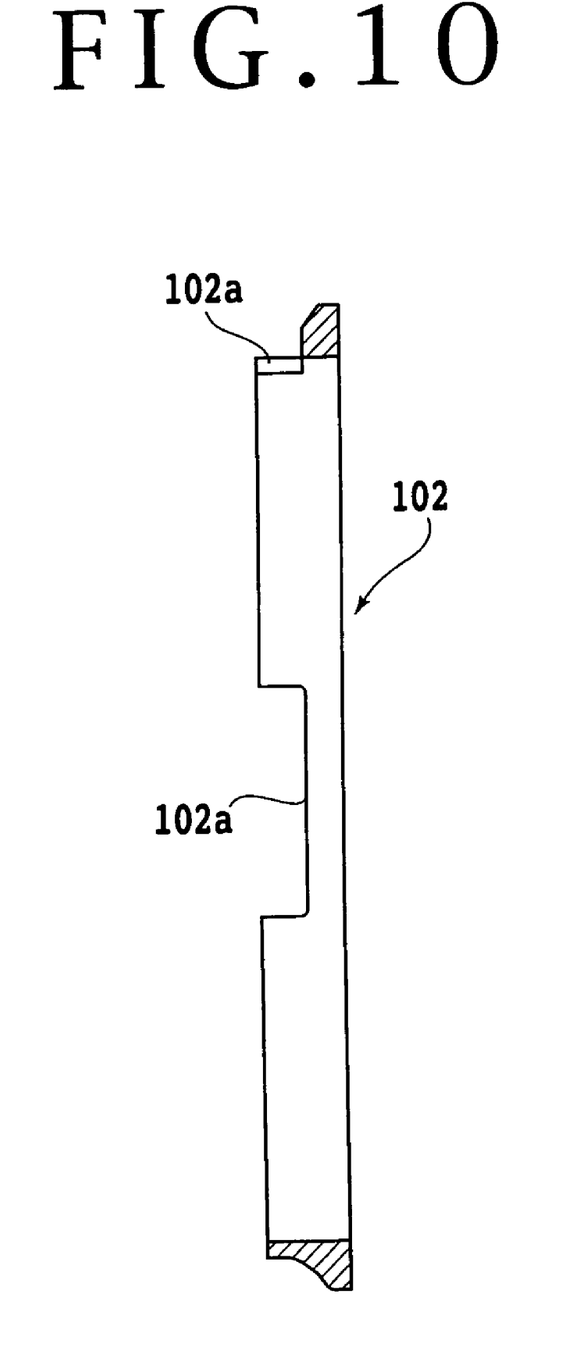
FIG. 10 is a cross section taken along the line 10—10 in FIG. 9.

FIG. 9 is an elevational view of the annular piston 102, and FIG. 10 is a cross section taken along the line 10—10 in FIG. 9. As shown in FIGS. 9 and 10, the annular piston 102 has four notches 102a. The front end portion 71a of the annular brake guide 71 is inserted through these notches 102a, and is engaged with the engaging portion 90f of the ringlike core member 88. As shown in FIG. 4, the end plate 82 of the multiplate brake mechanism 74 is integrally formed with a projection 82a, and the outermost circumference of the annular piston 102 is engaged with the projection 82a, thereby attaining radial positioning of the ringlike armature member 98.

Figure 11A:
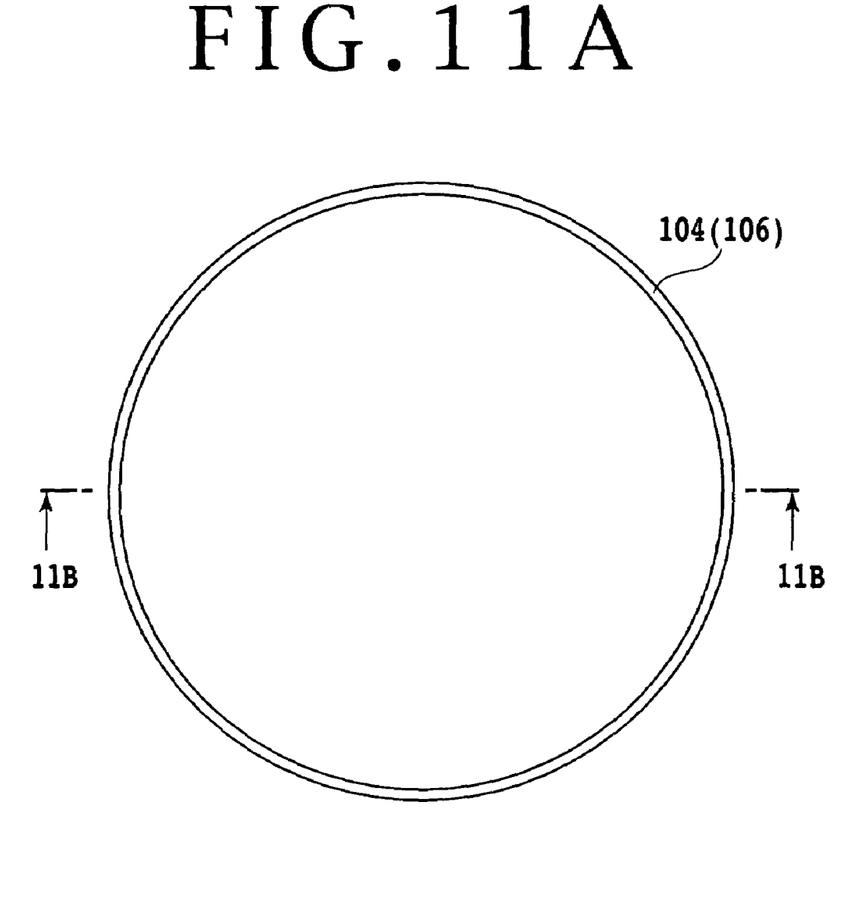
FIG. 11A is an elevational view of a restriction member.
Figure 11B:
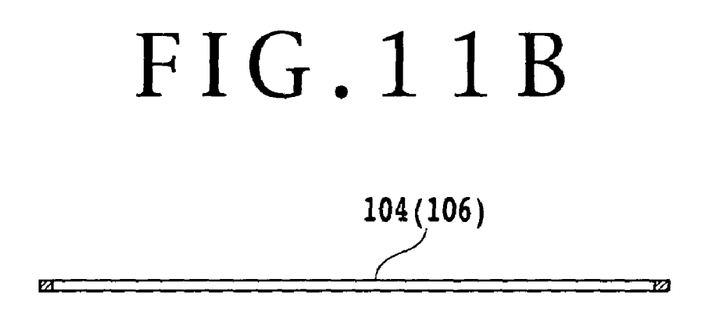
FIG. 11B is a cross section taken along the line 11B—11B in FIG. 11A.

An annular restriction member 104 is inserted between the ringlike core member 88 and the ringlike armature member 98 so as to be disposed adjacent to the first and third tapering surfaces 90d and 98a. Similarly, an annular restriction member 106 is inserted between the ringlike core member 88 and the ringlike armature member 98 so as to be disposed adjacent to the second and fourth tapering surfaces 92c and 98b. FIG. 11A is an elevational view of the annular restriction member 104, and FIG. 11B is a cross section taken along the line 11B—11B in FIG. 11A. Although not especially shown, the annular restriction member 106 is similar in shape to the annular restriction member 104 except a difference in size.

When a current is passed through the exciting coil 96, the armature member 98 is magnetically attracted toward the core member 88 in a direction perpendicular to the first to fourth tapering surfaces 90d, 92c, 98a, and 98b. However, since the annular restriction members 104 and 106 are provided between the core member 88 and the armature member 98, radial displacement of the armature member 98 is prevented and the armature member 98 is therefore attracted in only the axial direction of the core member 88.

An annular coned disc spring 108 is interposed between the ringlike core member 88 and the annular extension 100 press-fitted with the ringlike armature member 98. The coned disc spring 108 exerts a biasing force in a direction of moving the armature member 98, the extension 100, and the piston 102 away from the multiplate brake mechanism 74 in the condition where no current is passed through the exciting coil 96. Accordingly, a clearance can be maintained between each brake plate 76 and its adjacent brake disc 78 in the multiplate brake mechanism 74, thereby reducing a dragging torque of the multiplate brake mechanism 74 in the off condition of the electromagnetic brake 120A (in the condition where no current is passed through the exciting coil 96).

There will now be described an assembling method for the electromagnetic brake 120A according to this preferred embodiment. First, the second ringlike core 92 is engaged with the first ringlike core 90, and the first ringlike core 90 is engaged with the annular brake guide 71 to assemble a core unit (combination). Thereafter, the annular extension 100 is press-fitted with the ringlike armature member 98 to assemble an armature unit (combination). Thereafter, the armature unit, the annular piston 102, the brake plates 76, and the brake discs 78 are mounted to the core unit.

In this mounting step, the annular restriction members 104 and 106 and the coned disc spring 108 are inserted between the ringlike core member 88 and the ringlike armature member 98, and the thicknesses of the end plates 82 and 84 are adjusted to adjust the gap between the core member 88 and the armature member 98, thus obtaining a subassembly. This subassembly is next mounted to the left side housing 30*b*. That is, the engaging portion 90*e* of the core member 88 is engaged with the engaging portion 110 of the left side housing 30*b*, and the annular brake guide 71 is fastened to the left side housing 30*b* by the screws 73, thereby fixing the subassembly inside the left side housing 30*b*.

Each of the electromagnetic brakes 120A and 120B according to this preferred embodiment is configured so that the ringlike armature member 98 is arranged radially outside of the ringlike core member 88. Accordingly, the cylindrical pressure member composed of the extension 100 and the piston 102 can be reduced in size, resulting in a reduction in size and weight of each electromagnetic brake. Further, the ringlike core member 88 is fixed to the annular brake guide 71 formed of stainless steel, so that the path from the fixed portion of the core member 88 to the gap forming portion thereof can be entirely formed of an iron-based material.

Similarly, the path from the fixed portion of the armature member 98 to the gap forming portion thereof is also entirely formed of an iron-based material, so that a change in gap amount due to a temperature change can be greatly reduced. As a result, it is possible to reduce a change in attraction force of the core member 88 due to a temperature change, that is, a change in depression force of the cylindrical pressure member (the extension 100+the piston 102) to the multiplate brake mechanism 74, thus providing a high-precision electromagnetic brake.

Figure 12:
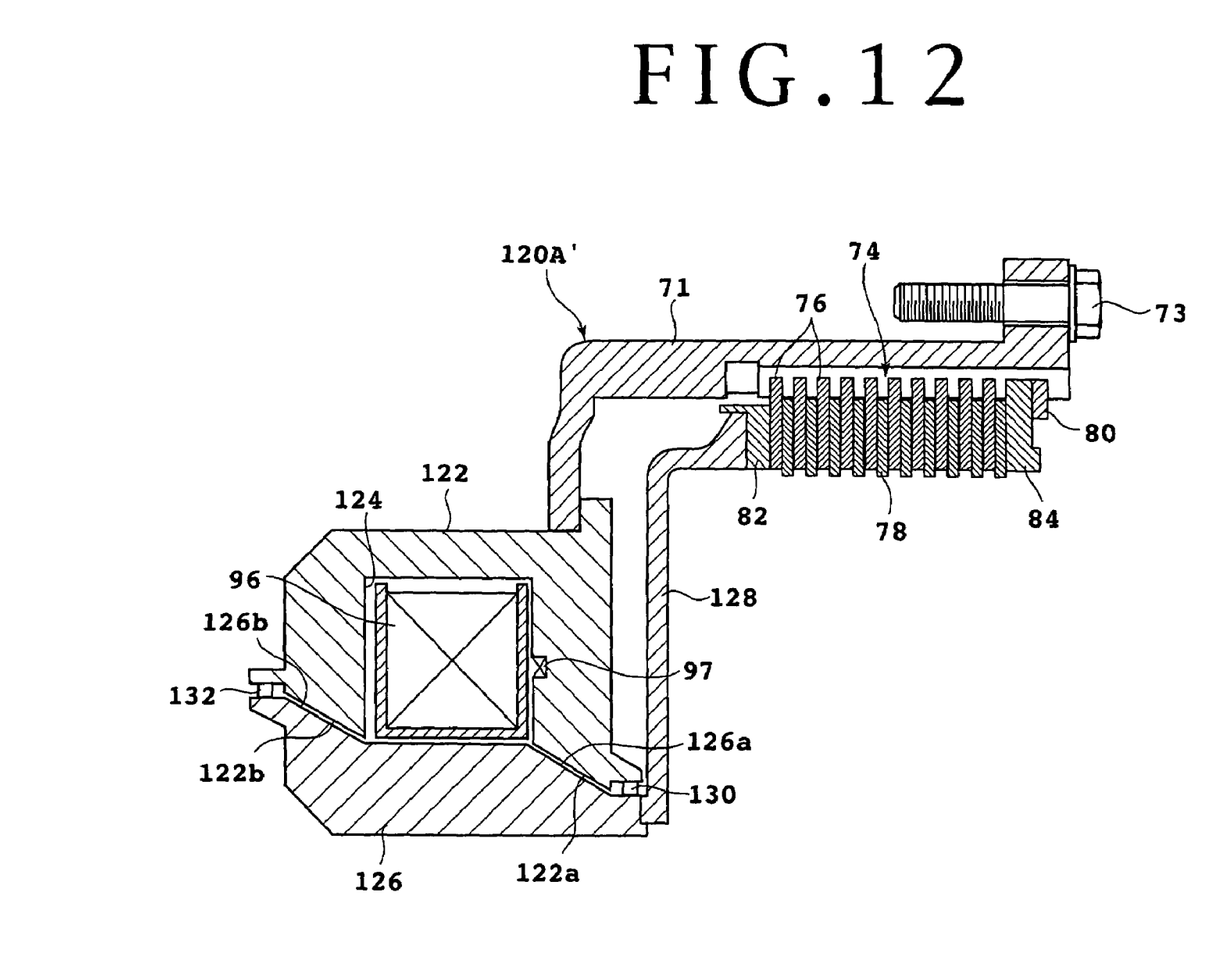
FIG. 12 is a schematic sectional view of an electromagnetic brake according to a second preferred embodiment of the present invention.

Referring next to FIG. 12, there is shown a schematic configuration of an electromagnetic brake 120A' according to a second preferred embodiment of the present invention. The same parts as those of the first preferred embodiment are denoted by the same reference numerals in FIG. 12. The electromagnetic brake 120A' includes a ringlike core member 122 having an annular groove 124. An exciting coil 96 is accommodated in the annular groove 124. The core member 122 has a first tapering surface 122*a* inclined a first angle with respect to the axis of the core member 122 and a second tapering surface 122*b* inclined a second angle with respect to the axis of the core member 122. Preferably, the first angle of the first tapering surface 122*a* and the second angle of the second tapering surface 122*b* are equal to each other.

A ringlike armature member 126 is located radially inside of the core member 122. The armature member 126 has a third tapering surface 126*a* complementary in shape to the first tapering surface 122*a* of the core member 122 and a fourth tapering surface 126*b* complementary in shape to the second tapering surface 122*b* of the core member 122. The ringlike armature member 126 is arranged radially inside of the core member 122 so that the third tapering surface 126*a* is opposed to the first tapering surface 122*a* and that the fourth tapering surface 126*b* is opposed to the second tapering surface 122*b*.

A pair of annular restriction members 130 and 132 are inserted between the core member 122 and the armature member 126, so as to prevent radial displacement of the armature member 126 when a current is passed through the exciting coil 96. An annular piston 128 is interposed between the ringlike armature member 126 and the end plate 82 of the multiplate brake mechanism 74.

The electromagnetic brake 120A' according to this preferred embodiment can exhibit effects similar to those of the electromagnetic brake 120A according to the first preferred embodiment. Although the size of the piston 128 as a cylindrical pressure member cannot be so reduced in this preferred embodiment, the ringlike armature member 126 can be reduced in size, thereby achieving a reduction in size and weight of the electromagnetic brake.

The operation of the drive force distributing device 20 shown in FIG. 3 will now be described. When both the electromagnetic brakes 120A and 120B are in an off state with no currents being passed through the exciting coils 96 of the electromagnetic brakes 120A and 120B, both the multiplate brake mechanisms 74 are in a disengaged state, so that the sun gears 68 of the planetary gear assemblies 58A and 58B idly rotate about the left and right rear axles 22 and 24, respectively. Accordingly, the drive force (torque) from the input shaft 50 is not transmitted to the rear axles 22 and 24. In this case, the rear wheels 26 and 28 idly rotate and the drive force is entirely transmitted to the front wheels 12 and 14, so that the four-wheel drive vehicle shown in FIG. 2 operates in a two-wheel drive mode (FF vehicle).

When a predetermined amount of current is passed through the exciting coils 96 of the electromagnetic brakes 120A and 120B to completely engage both the multiplate brake mechanisms 74 through the extensions 100 and the pistons 102 of the electromagnetic brakes 120A and 120B, the sun gears 68 of the planetary gear assemblies 58A and 58B are fixed to the left and right side housings 30*b* and 30*c*, respectively, so that the drive force from the input shaft 50 is transmitted through the ring gear 62, the planet gears 72, and the planetary carriers 64 to the left and right rear axles 22 and 24. Accordingly, the drive force from the input shaft 50 is equally divided between the rear axles 22 and 24 and transmitted thereto. As a result, the four-wheel drive vehicle shown in FIG. 2 operates in a four-wheel drive mode to run straight. In the case of a front-engine rear-drive (FR) vehicle, the entirety of the drive force is equally divided between the rear wheels, and this vehicle runs straight.

In cornering or escaping from a muddy place, the amperages of the currents passing through the exciting coils 96 of the electromagnetic brakes 120A and 120B are controlled to thereby arbitrarily distribute the drive force from the input shaft 50 between the rear axles 22 and 24, so that optimum cornering control and/or easy escape from the muddy place can be realized.

While the drive force distributing device 20 provided in relation to the rear axles 22 and 24 has been described above with reference to FIGS. 2 to 12, the drive force distributing device 6 provided in relation to the front axles 8 and 10 as shown in FIG. 1 also has similar operations and effects. Further, while the drive force distributing device 20 is provided in relation to the rear axles 22 and 24 of the four-wheel drive vehicle in each preferred embodiment, the device 20 may be provided in relation to the rear axles of an FR vehicle.

Further, while the electromagnetic brake of the present invention is applied to the drive force distributing device 20 in each preferred embodiment, the present invention is not limited to each preferred embodiment, but may be applied to any mechanisms or devices having an electromagnetic brake interposed between a fixed housing and a rotating member.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An electromagnetic brake interposed between a fixed housing and a rotating member at least partially accommodated in said fixed housing, comprising:
a multiplate brake mechanism having a plurality of brake plates mounted on said fixed housing and a plurality of brake discs mounted on said rotating member so as to be arranged in alternate relationship with said brake plates;
a ringlike core member fixed in said fixed housing, said ringlike core member having an annular groove and a first tapering surface inclined a first angle with respect to the axis of said ringlike core member;
an annular exciting coil accommodated in said annular groove of said ringlike core member;
a ringlike armature member having an axial length and arranged radially outside of said ringlike core member along the entire axial length of the ringlike armature member, said ringlike armature member having a second tapering surface complementary in shape to said first tapering surface, said second tapering surface being opposed to said first tapering surface;
a first annular restriction member provided between the outer circumferential surface of said ringlike core member and the inner circumferential surface of said ringlike armature member at a position adjacent to said first and second tapering surfaces, said first annular restriction member being a ring and resting radial movement of said ringlike armature member; and
a cylindrical pressure member movable in a direction of pressing said multiplate brake mechanism, said cylindrical pressure member having a first end fixed to an outer circumferential portion of said ringlike armature member and a second end engaged with said multiplate brake mechanism.

2. An electromagnetic brake according to claim 1, wherein said ringlike core member further has a third tapering surface inclined a second angle with respect to the axis of said ringlike core member; and said ringlike armature member further has a fourth tapering surface complementary in shape to said third tapering surface.

3. An electromagnetic brake according to claim 1, further comprising elastic means provided between said ringlike core member and said ringlike armature member for axially exerting an elastic force.

4. An electromagnetic brake according to claim 1, further comprising an annular brake guide having one end fixed to said fixed housing and another end fixed to said ringlike core member;
said annular brake guide being formed of the same type of material as those of said ringlike core member and said ringlike armature member.

5. An electromagnetic brake interposed between a fixed housing and a rotating member at least partially accommodated in said fixed housing, comprising:
a multiplate brake mechanism having a plurality of brake plates mounted on said fixed housing and a plurality of brake discs mounted on said rotating member so as to be arranged in alternate relationship with said brake plates;
a ringlike core member fixed in said fixed housing, said ringlike core member having an annular groove and a first tapering surface inclined a first angle with respect to the axis of said ringlike core member;
an annular exciting coil accommodated in said annular groove of said ringlike core member;
a ringlike armature member arranged radially outside of said ringlike core member, said ringlike armature member having a second tapering surface complementary in shape to said first tapering surface, said second tapering surface being opposed to said first tapering surface;
a first annular restriction member provided between the outer circumferential surface of said ringlike core member and the inner circumferential surface of said ringlike armature member at a position adjacent to said first and second tapering surfaces;
a cylindrical pressure member movable in a direction of pressing said multiplate brake mechanism, said cylindrical pressure member having a first end fixed to an outer circumferential portion of said ringlike armature member and a second end engaged with said multiplate brake mechanism; and
a second annular restriction member provided between the outer circumferential surface of said ringlike core member and the inner circumferential surface of said ringlike armature member at a position adjacent to said third and fourth tapering surfaces,
wherein said ringlike core member further has a third tapering surface inclined a second angle with respect to the axis of said ringlike core member, and said ringlike armature member further has a fourth tapering surface complementary in shape to said third tapering surface.

6. An electromagnetic brake interposed between a fixed housing and a rotating member at least partially accommodated in said fixed housing, comprising:
a multiplate brake mechanism having a plurality of brake plates mounted on said fixed housing and a plurality of brake discs mounted on said rotating member so as to be arranged in alternate relationship with said brake plates;
a ringlike core member fixed in said fixed housing, said ringlike core member having an annular groove and a first tapering surface inclined a first angle with respect to the axis of said ringlike core member;
an annular exciting coil accommodated in said annular groove of said ringlike core member;
a ringlike armature member arranged entirely radially inside of said ringlike core member, said ringlike armature member having a second tapering surface complementary in shape to said first tapering surface, said second tapering surface being opposed to said first tapering surface; and
a pressure member movable in a direction of pressing said multiplate brake mechanism, said pressure member having a first end fixed to said ringlike armature member and a second end engaged with said multiplate brake mechanism,
wherein said ringlike core member further includes a third tapering surface inclined a second angle with respect to the axis of said ringlike core member, and said ringlike armature member further includes a fourth tapering surface complementary in shape to said third tapering surface, and wherein each of said first to fourth tapering surfaces is inclined in a same direction with respect to the axis of said ringlike core member.

7. An electromagnetic brake according to claim 6, further comprising a first annular restriction member provided between the inner circumferential surface of said ringlike core member and the outer circumferential surface of said ringlike armature member at a position adjacent to said first and second tapering surfaces, said first annular restriction member being a ring and restricting radial movement of said ringlike armature member.

8. An electromagnetic brake according to claim 7, further comprising a second annular restriction member provided between the inner circumferential surface of said ringlike core member and the outer circumferential surface of said ringlike armature member at a position adjacent to said third and fourth tapering surfaces.

9. An electromagnetic brake according to claim 6, further comprising an annular brake guide having one end fixed to said fixed housing and another end fixed to said ringlike core member;

said annular brake guide being formed of the same type of material as those of said ringlike core member and said ringlike armature member.

10. An electromagnetic actuator comprising:
a ringlike core member having an annular groove and a first tapering surface inclined a first angle with respect to the axis of said ringlike core member;
an annular exciting coil accommodated in said annular groove of said ringlike core member;
a ringlike armature member having an axial length and arranged entirely radially outside of said ringlike core member along the entire axial length of the ringlike armature member said ringlike armature member having a second tapering surface complementary in shape to said first tapering surface, said second tapering surface being opposed to said first tapering surface; and
an annular restriction member provided between the outer circumferential surface of said ringlike core member and the inner circumferential surface of said ringlike armature member at a position adjacent to said first and second tapering surfaces, said annular restriction member being a ring and restricting radial movement of said ringlike armature member.

11. An electromagnetic actuator according to claim 10, wherein said ringlike core member further has a third tapering surface inclined a second angle with respect to the axis of said ringlike core member; and said ringlike armature member further has a fourth tapering surface complementary in shape to said third tapering surface.

* * * * *